(12) United States Patent
van Gogh et al.

(10) Patent No.: US 8,949,802 B1
(45) Date of Patent: Feb. 3, 2015

(54) SHARDING PROGRAM COMPILATION FOR LARGE-SCALE STATIC ANALYSIS

(75) Inventors: Jeffrey van Gogh, Redmond, WA (US); Manuel Victor Klimek, Ottobrunn (DE)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/276,116

(22) Filed: Oct. 18, 2011

(51) Int. Cl.
*G06F 9/44* (2006.01)

(52) U.S. Cl.
USPC .......................... 717/140; 717/141; 717/145

(58) Field of Classification Search
USPC .......... 709/231; 717/108, 131, 146, 166, 168, 717/103–104, 106, 136, 140–141, 151, 100, 717/120–123, 126–127; 715/513
See application file for complete search history.

(56) References Cited

U.S. PATENT DOCUMENTS

| | | | | |
|---|---|---|---|---|
| 5,361,357 | A * | 11/1994 | Kionka ........................ | 717/151 |
| 6,922,827 | B2 * | 7/2005 | Vasilik et al. ................ | 717/140 |
| 6,973,646 | B1 * | 12/2005 | Bordawekar et al. ........ | 717/146 |
| 7,340,726 | B1 * | 3/2008 | Chelf et al. .................. | 717/126 |
| 7,565,647 | B2 * | 7/2009 | Davidov et al. .............. | 717/140 |
| 7,596,782 | B2 * | 9/2009 | Ebbo et al. ................... | 717/141 |
| 7,640,533 | B1 * | 12/2009 | Lottero et al. ................ | 717/108 |
| 7,721,272 | B2 * | 5/2010 | Mockford ..................... | 717/140 |
| 8,271,964 | B2 * | 9/2012 | Zorn et al. .................... | 717/140 |
| 8,458,661 | B2 * | 6/2013 | Gu ................................ | 717/122 |
| 8,627,286 | B2 * | 1/2014 | Feigen .......................... | 717/123 |
| 2001/0037399 | A1 * | 11/2001 | Eylon et al. .................. | 709/231 |
| 2004/0088681 | A1 * | 5/2004 | Berg et al. .................... | 717/120 |
| 2004/0148569 | A1 * | 7/2004 | Sengodan ..................... | 715/513 |
| 2005/0044523 | A1 * | 2/2005 | Wendt .......................... | 717/100 |
| 2005/0044537 | A1 * | 2/2005 | Zatloukal ...................... | 717/140 |
| 2005/0262482 | A1 * | 11/2005 | Wagner et al. ................ | 717/120 |
| 2005/0268283 | A1 * | 12/2005 | Clemm et al. ................ | 717/121 |
| 2006/0136881 | A1 * | 6/2006 | Nesbitt et al. ................ | 717/140 |
| 2006/0161898 | A1 * | 7/2006 | Bauman et al. ............... | 717/127 |
| 2007/0055963 | A1 * | 3/2007 | Waddington et al. ......... | 717/140 |
| 2007/0277159 | A1 * | 11/2007 | Wagner et al. ................ | 717/136 |
| 2008/0059946 | A1 * | 3/2008 | Harding et al. ............... | 717/106 |
| 2009/0288076 | A1 * | 11/2009 | Johnson et al. ............... | 717/168 |
| 2010/0192121 | A1 * | 7/2010 | Unnithan et al. ............. | 717/103 |
| 2011/0161938 | A1 * | 6/2011 | Marum et al. ................ | 717/131 |
| 2011/0239184 | A1 * | 9/2011 | Feigen .......................... | 717/104 |

(Continued)

OTHER PUBLICATIONS

Stork, Christian H. et al., Compressed Abstract Syntax Trees for Mobile Code, 2001, CiteSeer.*

(Continued)

*Primary Examiner* — Lewis A Bullock, Jr.
*Assistant Examiner* — Gilles Kepnang
(74) *Attorney, Agent, or Firm* — Birch, Stewart, Kolasch & Birch, LLP

(57) ABSTRACT

A system, method, and computer-readable medium for static analysis of large-scale computer programs that uses a compiler to shard the computer programs by source files. Original compilation information is received for one or more groups of source files that reference modules in module containers. The compiler is run to determine a set of modules in the module containers and other source files that are referenced by a source file of the groups of source files. The compilation information is modified on the basis of the source file, the set of modules and the referenced source files. Static analysis is performed on the source file using the modified compilation information. Static analysis is efficiently performed over large-scale computer programs.

12 Claims, 14 Drawing Sheets

(56) References Cited

U.S. PATENT DOCUMENTS

2011/0239195 A1* 9/2011 Lin et al. .................. 717/126
2011/0283268 A1* 11/2011 Salter ....................... 717/140
2012/0222023 A1* 8/2012 Petrovick et al. .......... 717/166

OTHER PUBLICATIONS

Zukowski, John, Chapter 8: The Java Compiler API , 2006, Springer.*

* cited by examiner

SHARDING PROGRAM COMPILATION FOR LARGE-SCALE STATIC ANALYSIS

FIELD OF THE INVENTION

The following relates to sharding program compilation and performing static analysis on large-scale computer programs.

BACKGROUND

A codebase can be extremely large, for example, on the order of 800,000 source files. Running static analysis on the code inside the source files can be very expensive in time (e.g. a single run could easily take a matter of days). In order to reduce the time, efficiencies may be obtained by running the static analysis in a distributed environment.

In the case of auto-forward-declaring languages, such as Java, JavaScript, Python, C#, and Visual Basic, the source files are compiled in bunches, which have cyclic dependencies. The sizes of these bunches greatly differ from compilation target to compilation target. Thus, even if thousands of machines are used to perform the static analysis, some machines will complete almost instantly where others will take a long time to perform the analysis. For example, in the case of java source files some targets complete much faster than others. Subsequently, machine resources are wasted and analysis still takes a long time to complete.

These auto-forwarding-declaring languages utilize libraries of code contained in modules. Library modules can contain predefined classes or other data structures that can be referenced by source files.

In the case of the Java programming language, Java classes (.class) are typically stored in jar files, (.jar). Jar files are an archive file format used to aggregate many Java class files and associated metadata and resources (for example text and images) into one file to distribute application software or libraries. Java source files (.java) that reference classes contained in Jar files are compiled into class files. Source files are files that contain source code to be compiled and can be analyzed by an analyzer.

Library modules, or in the case of Java, Jar files, often contain more code than is required by references in source files. Different Jar files contain various amounts of extra code than is required. As software systems scale up, it has been determined that an extremely large amount of data is downloaded when performing static analysis (for example, in ad-hoc testing it was found that greater than 200 MB of data was unnecessarily downloaded for an average target). Downloading of data that is not required contributes substantially to increasing the amount of time to perform the analysis and also wastes computing resources.

BRIEF SUMMARY

A system, method, and computer-readable medium for static analysis of large-scale computer programs that uses a compiler to shard the computer programs by source files. Original compilation information is received, including one or more groups of source files and a module path that identifies a location of module containers. The one or more groups of source files reference modules in the module containers. A compiler is run to determine a set of modules in the module containers that are referenced by a single source file of the groups of source files and other source files that are referenced by the single source file. Modifying the compilation information on the basis of the single source file, by replacing the one or more groups of source files with the single source file, by replacing the module path with a new module path, the new module path identifying the location of the referenced set of modules, and by including other source files referenced by the single source file. Static analysis is performed on the single source file using the modified compilation information. Static analysis is efficiently performed over large-scale computer programs.

These and other aspects are described in detail with respect to the drawings.

BRIEF DESCRIPTION OF THE DRAWINGS

The accompanying drawings constitute part of this specification. In the drawings.

DETAILED DESCRIPTION

Figure 2:
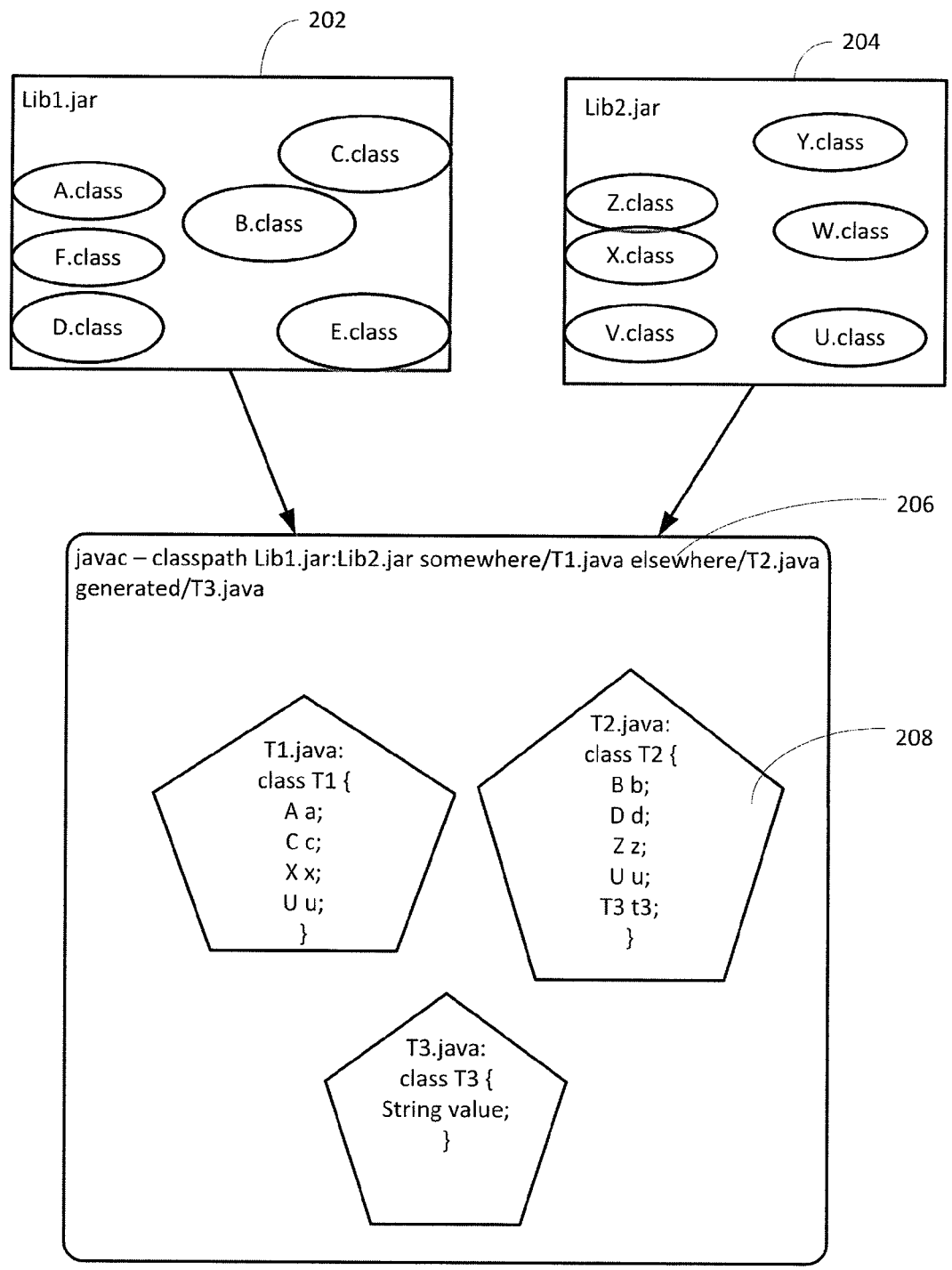
FIG. 2 shows example files used in conventional compilation.

FIG. 2 (Conventional Compilation) shows an example of a conventional Java compilation that provides inputs for static analysis. As mentioned above, Java source files are indicated by the .Java extension. The Java compiler produces class files having the extension .class. Java class files can be combined into a single Jar file, having an extension .jar.

As can be seen in FIG. 2, two Jar files 202, 204 are present in a program source. When invoked by the Java compiler, the command line "javac . . . " 206 will produce new classes that reference a subset of classes in the Jar files. Although classes "E", "Y", "V", and "W" are included as part of a Jar file, they are not required by the source files 208. Also, some of the source files 208 (Bunch T1, T2, T3) are interdependent (e.g., T2 and T3 are interdependent).

In order to do effective static analysis on a large codebasis, an improvement in efficiency can be obtained by determining a minimum set of classes and dependent source files necessary to perform static analysis on a single source file basis. Determining a minimized set of dependent source files and class files can be done in several ways. A set of class files and source files can be built using a technique of sharding. Sharding is a database technique by which the database is partitioned horizontally across multiple instances of the schema.

Sharding, as applied herein, is a technique of partitioning analysis by source files. This technique of performing static analysis can be considered as being two phases. Example approaches for Phase 1 of building a minimized set of dependent source files and class files are provided below. Phase 2 of performing static analysis can then be run using the minimum set of dependent source files.

Figure 1:
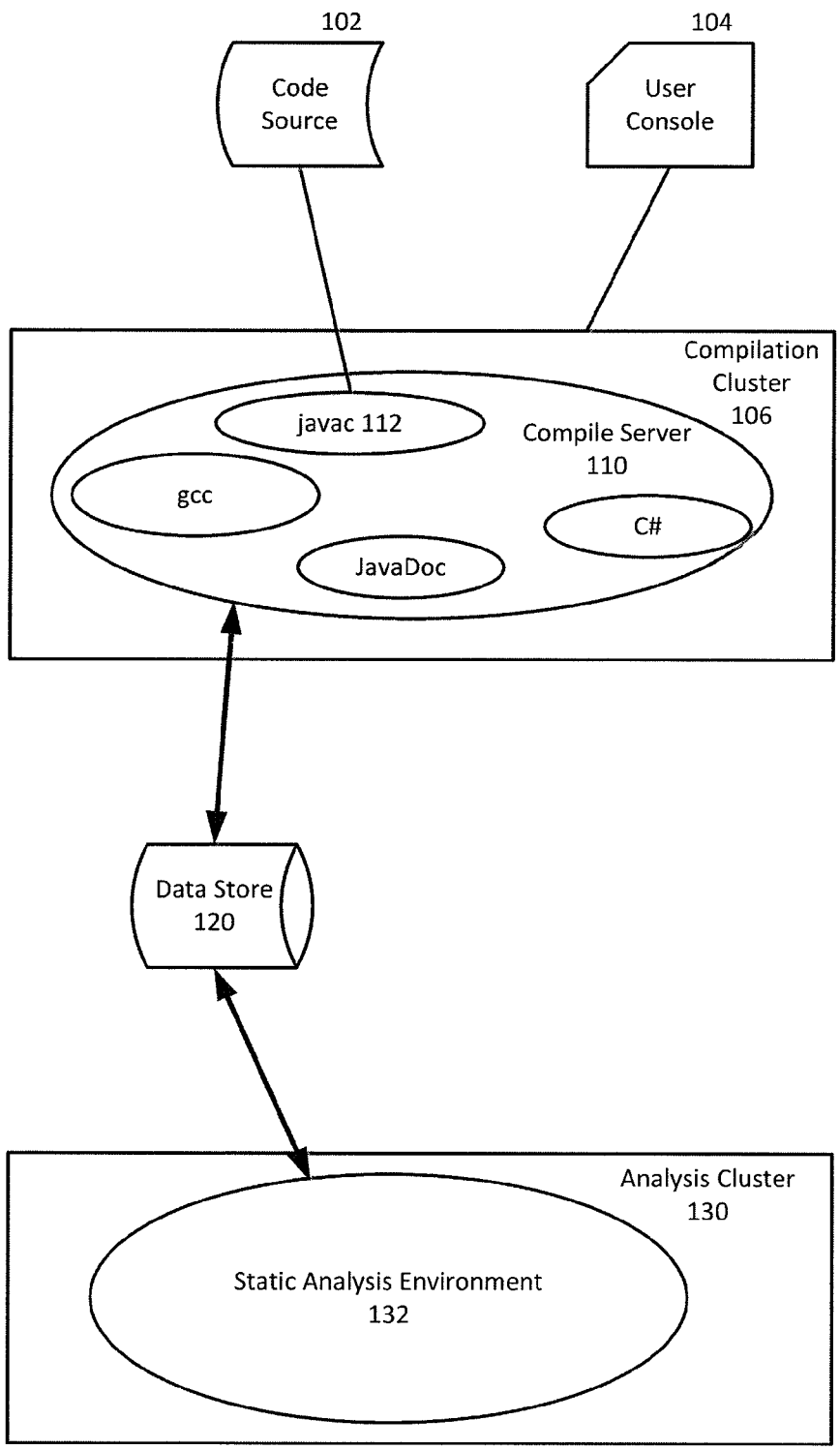
FIG. 1 is a block diagram for a system for performing sharding and static analysis.

FIG. 1 shows a system diagram for implementing Phase 1 and Phase 2. Program code can be provided from an external source 102. Interaction with the system can be by way of a user console 104. A compilation cluster 106 can consist of one or more compilation servers 110. Compilers that can be run on compilation servers include the Java compiler 112, among other compilers, such as gcc, can C#. JavaDoc can be used to generate documentation for Java programs. An analysis cluster 130 can consist of one or more static analysis environments 132. The compilation cluster 106 and analysis cluster 130 can store and retrieve structured data using data store 120. It is understood that the compilation cluster 106 and analysis cluster 130 can be the same computer cluster. Also, the data store 120 can be a database system implemented as a network of computers.

Phase 1—Approach (a)—Instrumented JavaFileManager

An approach to phase 1, of building a minimum set of dependent sources that are necessary to perform static analysis on a single source file basis, is to use an instrumented file manager to monitor which files are accessed by the compiler. In the case of Java, the JavaFileManager class can be used for this approach. The JavaFileManager can be instrumented to log actions that it takes. The instrumented JavaFileManager can be created to obtain files accessed by the compiler during compilation and log the obtained files as a list of accessed files.

Figure 4:
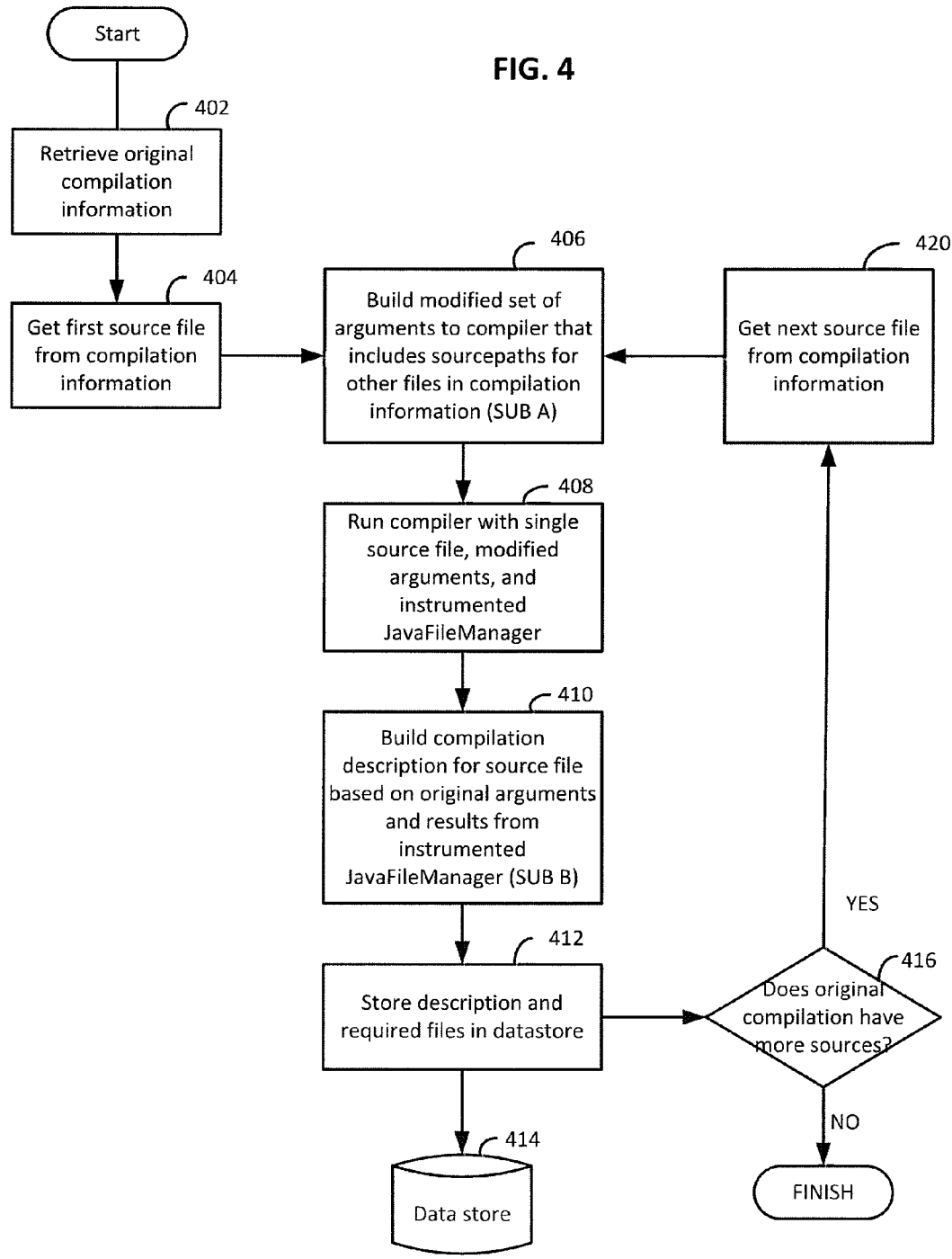
FIG. 4 is a flowchart for a technique (a) for a sharding phase.

FIG. 4 is a flowchart for the approach that uses the instrumented JavaFileManager. At step 402, original compilation information is obtained. Original compilation information is command line that will be used to run a compiler. The original compilation information can include a classpath, a list of source files, and other compiler specific arguments that are included in an initial compiler command line (see, for example, the javac command line shown in FIG. 2). A classpath is an absolute or relative path to class files and/or jar files. At step 404, a first source file is obtained from the compilation information (for example T1.java shown in FIG. 2). At step 406, a modified set of arguments to the compiler is built to include source paths for other files in the compilation information. Details of step 406 (SUB A) are shown in FIG. 5.

Figure 5:
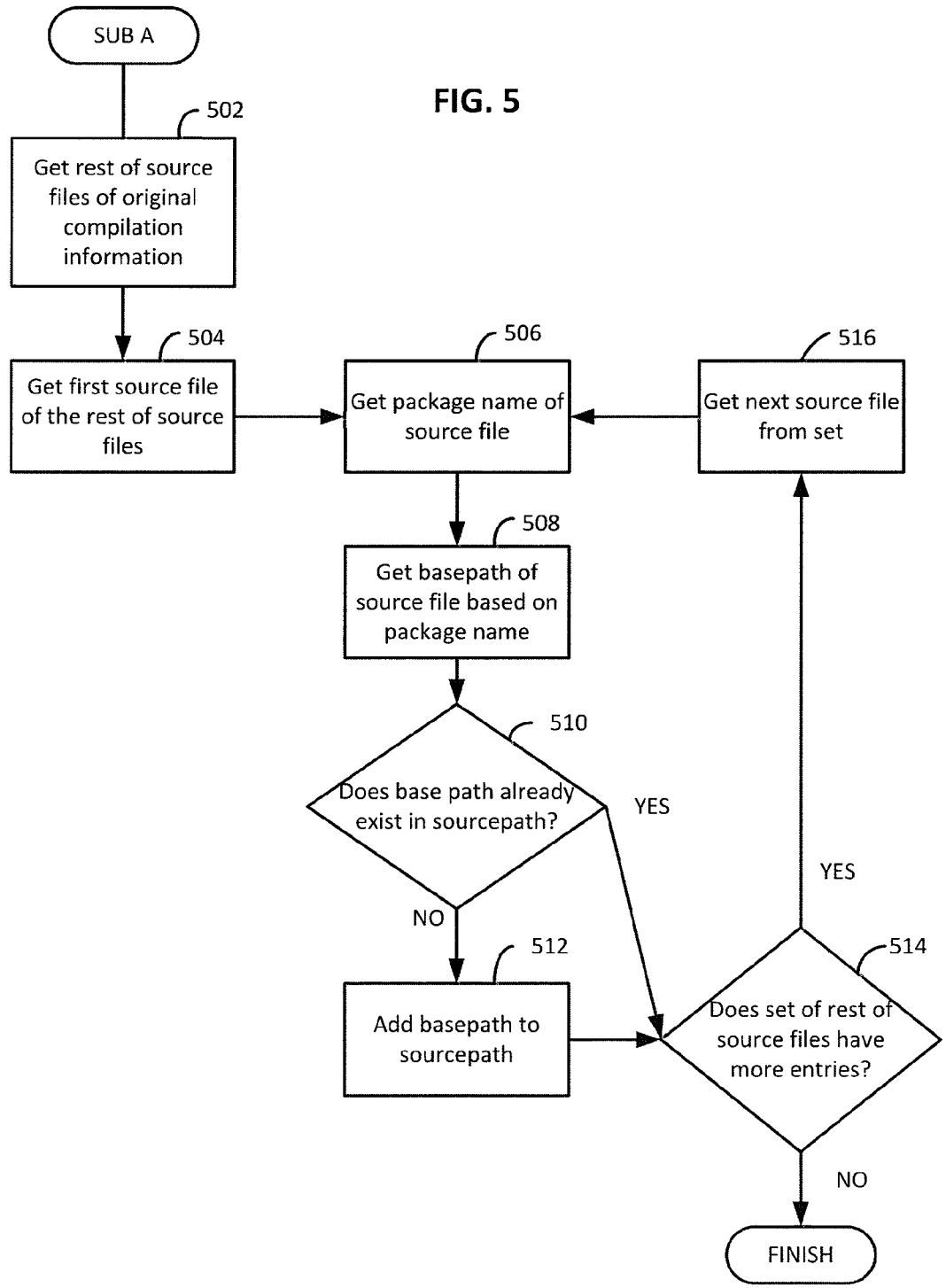
FIG. 5 is a flowchart for a modifying step of the flowchart of FIG. 4.

In FIG. 5, step 502, the remaining source files, other than the source file obtained at step 404 or step 420, are obtained from the compilation information (e.g., source files T2 and T3 in FIG. 2). At step 504, the first source file of the remaining set is obtained. At step 506, the package name of the source file is obtained. At step 508, the base path of the source file is obtained based on the package name. At step 510, it is determined whether the base path already exists in the existing sourcepath. A sourcepath is an absolute or relative path to source files. The original compilation information may have included a sourcepath. At step 512, if it does not already exist, the base path is added to the sourcepath. At step 514, a decision is made as to whether there are more entries in the set of source files. At step 516, the next source file is obtained from the set, and steps 506 to 514 are repeated until it is determined, at step 514, that there are no more source files in the set.

The result of step 406 is a sourcepath that can be provided to modify arguments in the command line for the compiler. At step 408, the compiler is run with a single source file, the modified arguments and the instrumented JavaFileManager. The instrumented JavaFileManager produces a list of source files and class files that are read by the compiler.

Figure 3:
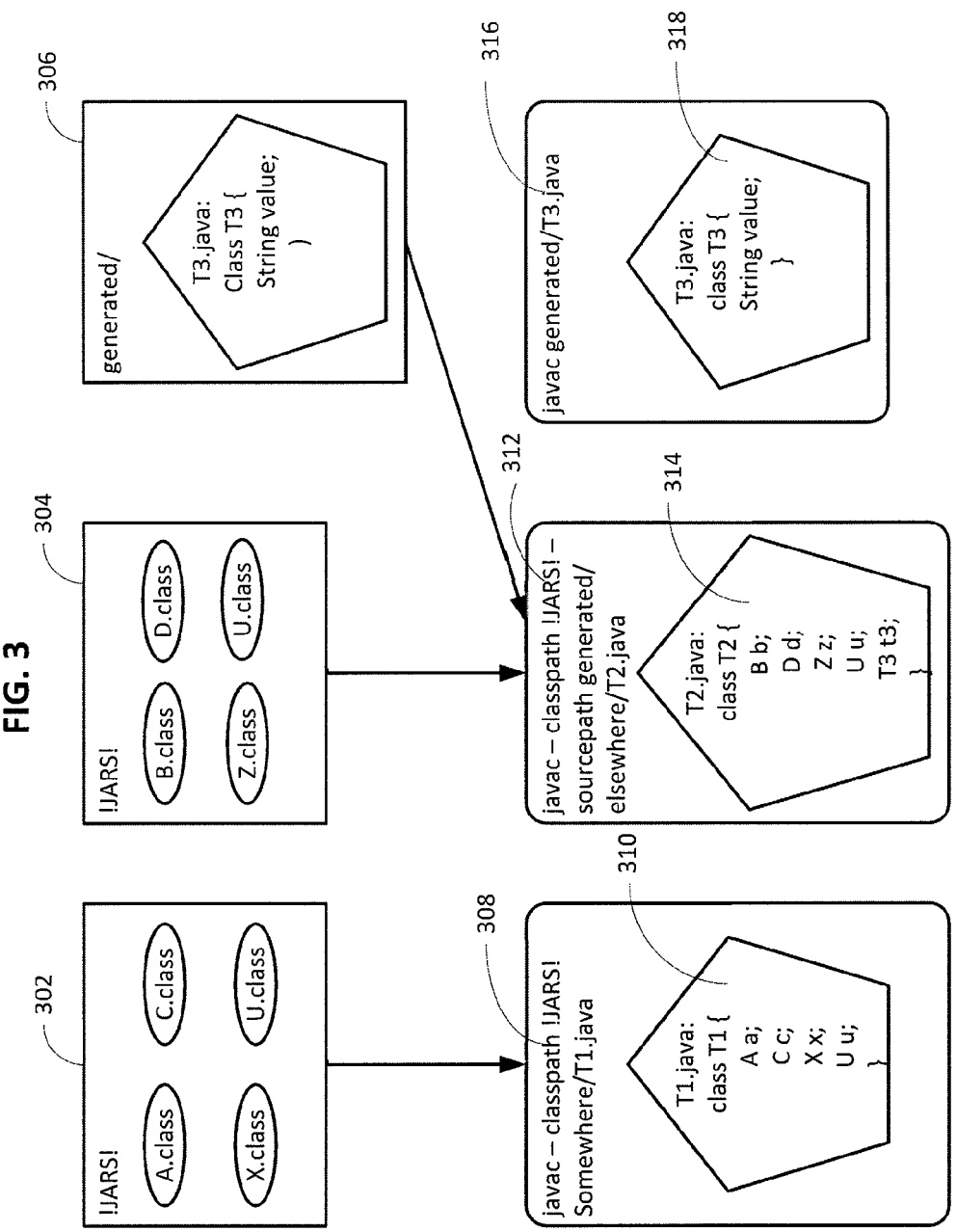
FIG. 3 shows example files resulting from sharded analysis.

FIG. 3 shows an example of files for the approach that uses the instrumented JavaFileManager. The instrumented JavaFileManager is provided to the compiler and tracks which files the compiler opens up for reading. In the example, the compiler is run for each source file 310, 314. In the example, the compiler also determines that in order to compile source file T2 314 it needs information from source file T3 306. Modified compilation arguments for compiler command lines 308, 312, 316 are created from the list of sources (command line "javac . . . "). The compiler is invoked for each source file 310, 314, 318 (T1, T2, T3) using the modified compilation arguments.

The compiler reports to the JavaFileManager that class files A, C, X, and U (which reference corresponding classes in Jar 302) are accessed during compilation of source file T1.java 310, while class files B, D, Z and U (Jar 304) are accessed during compilation of source file T2.java.

At step 410, a compilation description for the source file is built based on original arguments and results from the instrumented JavaFileManager. Details of step 410 (SUB B) are shown in the flowchart of FIG. 6.

Figure 6:
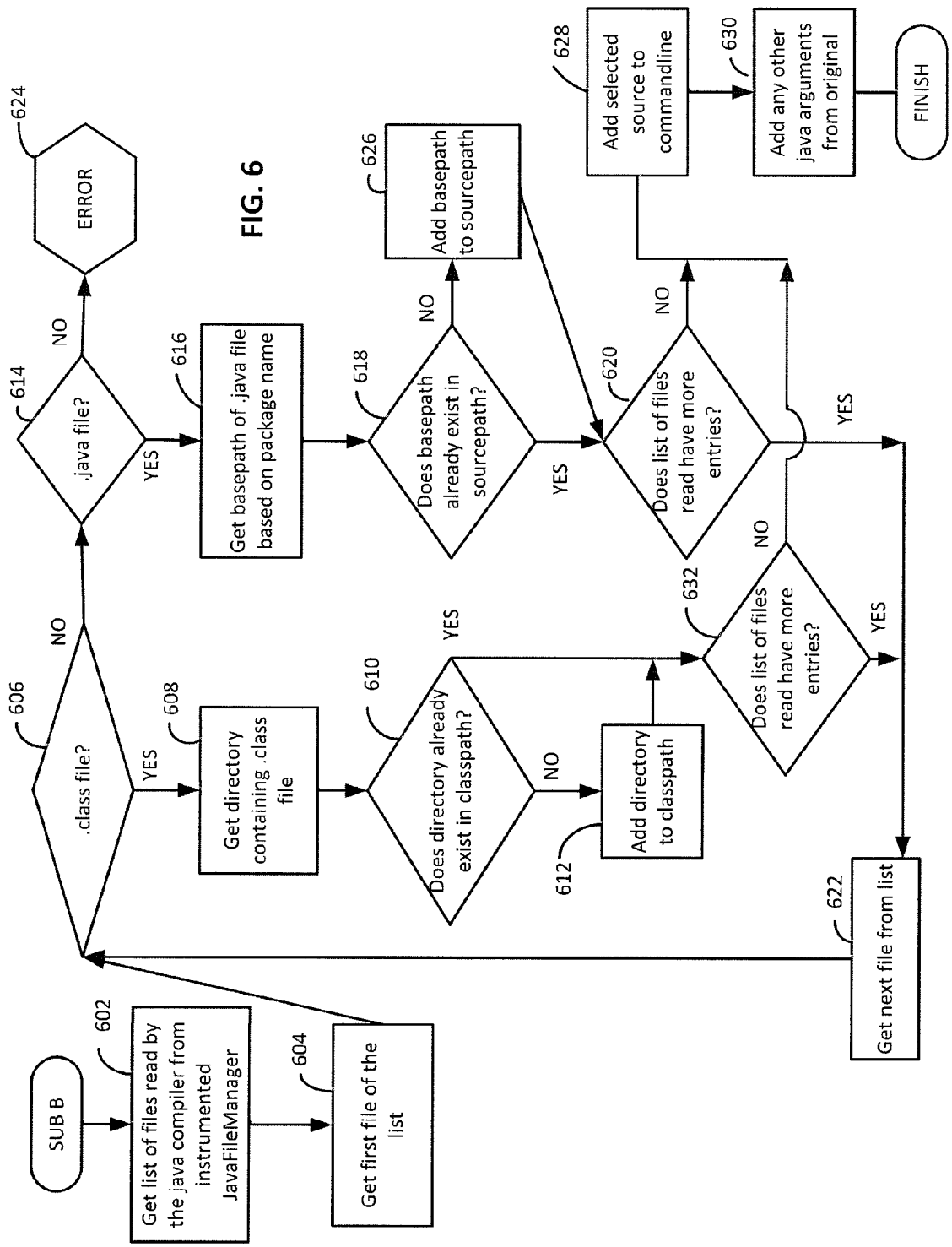
FIG. 6 is a flowchart for a step of building a compilation description of FIG. 4.

In FIG. 6, step 602, the list of files read by the Java compiler during compilation of a single source file is obtained from the instrumented JavaFileManager. At step 604, the first file is obtained from the list of files.

At step 606, a decision is made as to whether the file is a class file (i.e., indicated by an extension .class). For files that are class files, at step 608, the directory containing the class file is obtained. At step 610, a decision is made as to whether the directory already exists in the classpath. At step 612, if it does not already exist in the classpath, the directory is added to the classpath, and at step 632, it is determined whether more entries are in the list of read files. Steps beginning at step 606 are repeated.

At step 614, a decision is made as to whether the file is a source file (i.e., indicated by an extension .java). For files that are source files, at step 616, the base path of the source file is obtained based on the package name. At step 618, a decision is made as to whether the base path already exists in the sourcepath. If it does not already exist, at step 626, the base path is added to the sourcepath. At step 620, it is determined whether more entries are in the list of read files. At step 622, the next file is obtained from the list of read files, and steps 606 to 618 are repeated.

If a file is neither a class file, at step 606, nor a source file, at step 614, an error may be generated at step 624. When there are no more files in the list of read files, at step 628, the selected source file from step 404 or step 420 is added to the command line. At step 630, any other java arguments are added verbatim from the original. Other java arguments can include flags passed to the compiler that are needed for compilation, but are not necessary for building a minimized set of dependent sources and classes. The result of step 410 is a selected source file, java arguments, a classpath, and a sourcepath.

An example result of step 410 is source file T1.java in FIG. 3 and classpath "!JARS!." In the case of the source file T2.java, the result of step 410 includes a sourcepath "generated/."

At step 412, the compilation description and required files are stored as structured data in a data store, such as data store 120. At step 416, it is determined whether there exist more source files in the original compilation information. At step 420, a next source file is obtained from the compilation information, and steps 406 to 412 are repeated until, at step 416, no more source files are in the original compilation information.

Phase I, Approach (b)—Abstract Syntax Tree

An approach to phase 1, of building a minimum set of dependent sources necessary to perform static analysis on a single source file basis, is to use an Abstract Syntax Tree (AST) for source files. The Abstract Syntax Tree generated by the compiler can be used to determine which types are needed for a compilation for each source file. An AST is a tree representation of the syntax structure of source code. Each node of the tree denotes an element type occurring in the source code. A type is a unit of code in the Java language that is used for resolution of source and class files. A type can include an operator, a constant or a variable.

In the case of Java, the Java compiler is run once. An analysis of the AST is done per source file. A list of files that define the types is used to modify the compilation arguments. In the case of the Java programming language, the list of classes and sources as well as the new javac command line arguments are generated and written to the data store per source file. Subsequently, sharding is done by splitting the analysis per source file.

Figure 7:
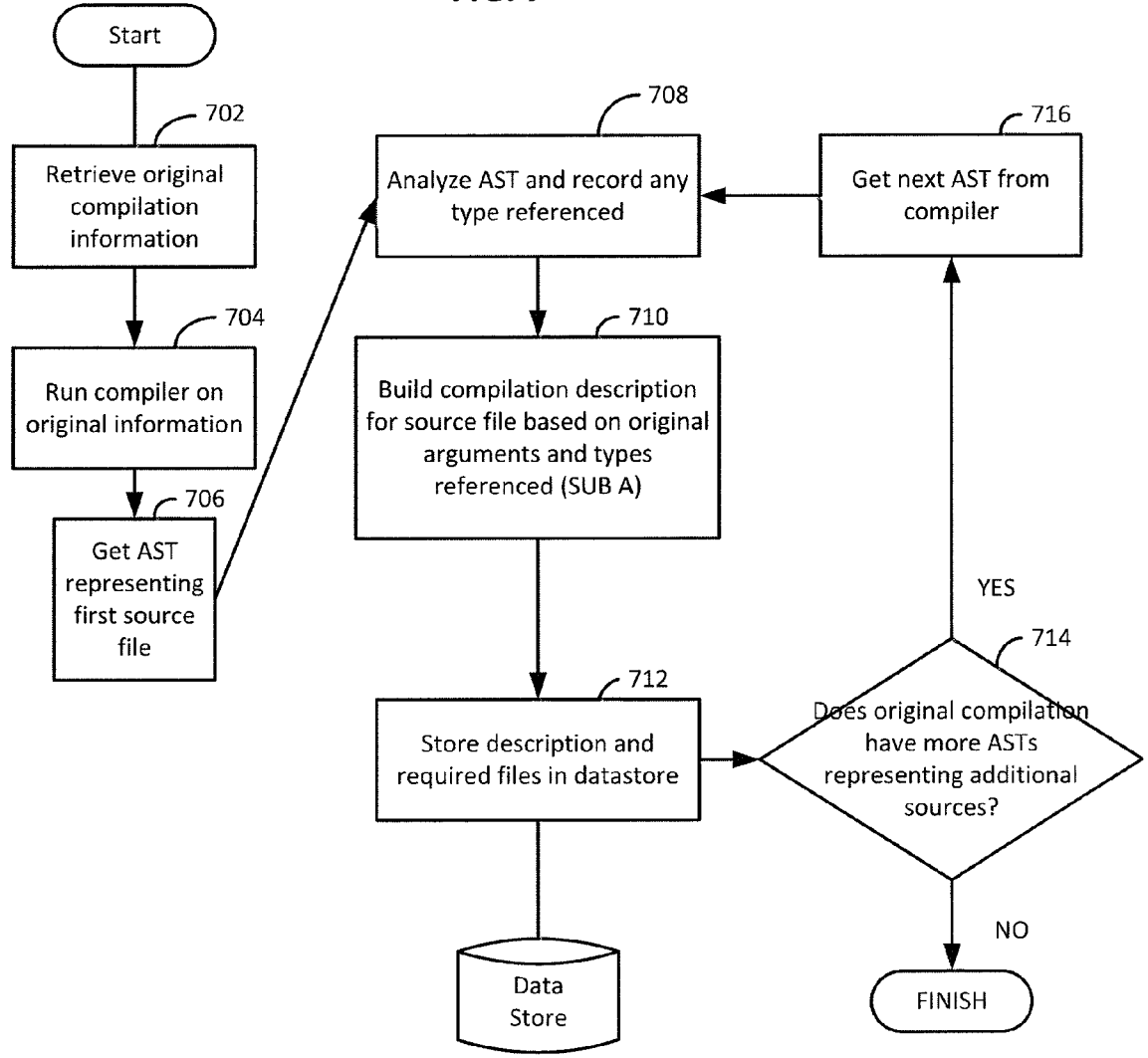
FIG. 7 is a flowchart for a technique (b) for a sharding phase.

FIG. 7 shows steps involved in the approach. At step 702, the original compilation information is obtained. The original compilation information can include a classpath, a list of source files, and additional java compiler arguments that are not necessary for building a minimized set of sources and classes that are included in an initial compiler command line. At step 704, the compiler is run on the original compilation information (an initial compiler command line is invoked). At step 706, the AST is obtained from the compilation for a first source file of the list of source files.

Figure 8:
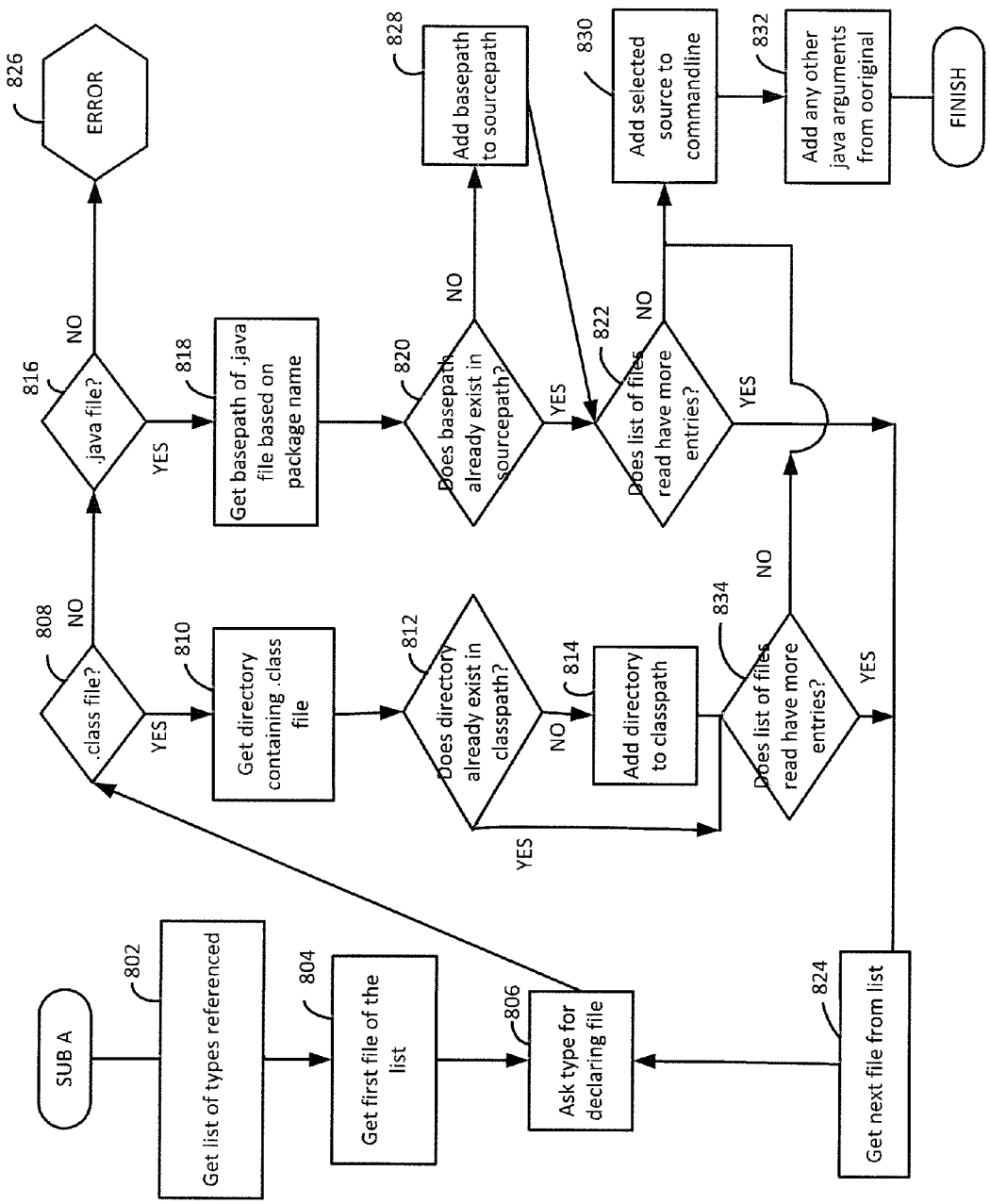
FIG. 8 is a flowchart for a step of building a compilation description of FIG. 7.

At step 708, the AST for the source file is analyzed to obtain the types that are referenced. At step 710 (SUB A), a compilation description for the source file is built based on original arguments for the compiler and types that are referenced. FIG. 8 shows detailed steps of building a compilation description using the list of types referenced.

At step 802, a list of types referenced for an AST for a source file is obtained. At step 804, a first type from the list of types is obtained. At step 806, a declaring file is determined for the type.

At step 808, a decision is made as to whether the file is a class file (i.e., indicated by .class). For files that are class files, at step 810, the directory containing the class file is obtained. At step 812 a decision is made as to whether the directory already exists in the classpath. At step 814, if it does not already exist in the classpath, the directory is added to the classpath, and at step 834, it is determined whether more entries are in the list of read files. Steps beginning with step 806 are repeated.

At step 816, a decision is made as to whether the file is a source file (i.e., indicated by .java). For files that are source files, at step 818, the base path of the source file is obtained based on the package name. At step 820, a decision is made as to whether the base path already exists in the sourcepath. If it does not already exist, at step 828, the base path is added to the sourcepath. At step 822, it is determined whether more entries are in the list of read files. At step 824, the next file is obtained from the list of read files, and steps 806 to 820 are repeated.

If a file is neither a class file, at step 808, nor a source file, at step 816, an error is generated at step 826. When there are no more files in the list of read files, at step 830, the selected source file from step 706 or step 716 is added to the commandline. At step 832, any other java arguments are added verbatim from the original. Such other Java arguments include flags passed to the compiler that are needed for compilation, but are not necessary for building a minimized set of dependent sources and classes. The result of step 710 is a selected source file, java arguments, and a classpath.

At step 712, the compilation description and required files are stored as structured data in a data store. At step 714, it is determined whether there exists more AST's representing additional source files from the original compilation information. At step 716, a next AST is obtained from the compilation information, and steps 708 to 712 are repeated until, at step 714, no more source files are in the original compilation information.

Phase I, Approach (c)—Hybrid

Another approach can be to combine the process of approach (a) with the process of approach (b). In this approach, instead of a compilation for each source file, the compiler is run once, which provides a set of all classes and sources needed for the whole compilation. The JavaFileManager is used to monitor which source and class files are accessed, while the compiler is run. A single file is produced that lists the files that were accessed. Entries are created in the data store for each source file, where the same set of classes and sources are listed for each entry. It has been found that this technique produces an excellent approximate minimum set of sources and classes needed to compile each source file with very little overhead.

Figure 9:
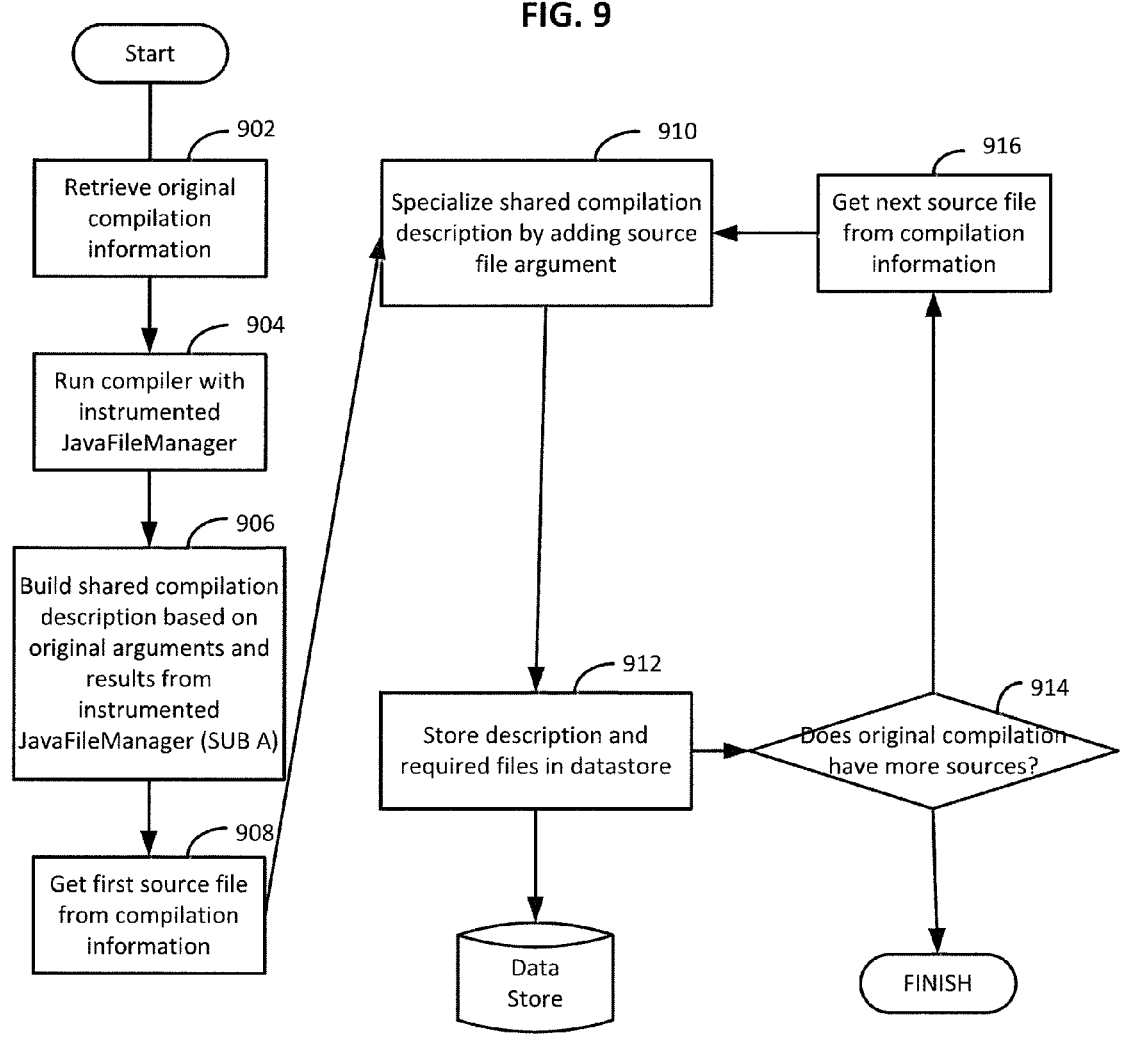
FIG. 9 is a flowchart for a technique (c) for a sharding phase.

FIG. 9 is a flowchart for the hybrid approach. At step 902, the original compilation information is obtained. The original compilation information can include a classpath, a list of source files, and other arguments to the java compiler that are not necessary to determining a minimized set of sources and classes that are included in an initial compiler commandline. At step 904, the compiler is run using the original compilation information, with the instrumented JavaFileManager.

At step 906, a compilation description for the source file is built based on original arguments and results from the instrumented JavaFileManager. Details of step 906 (SUB A) are shown in the flowchart of FIG. 10.

Figure 10:
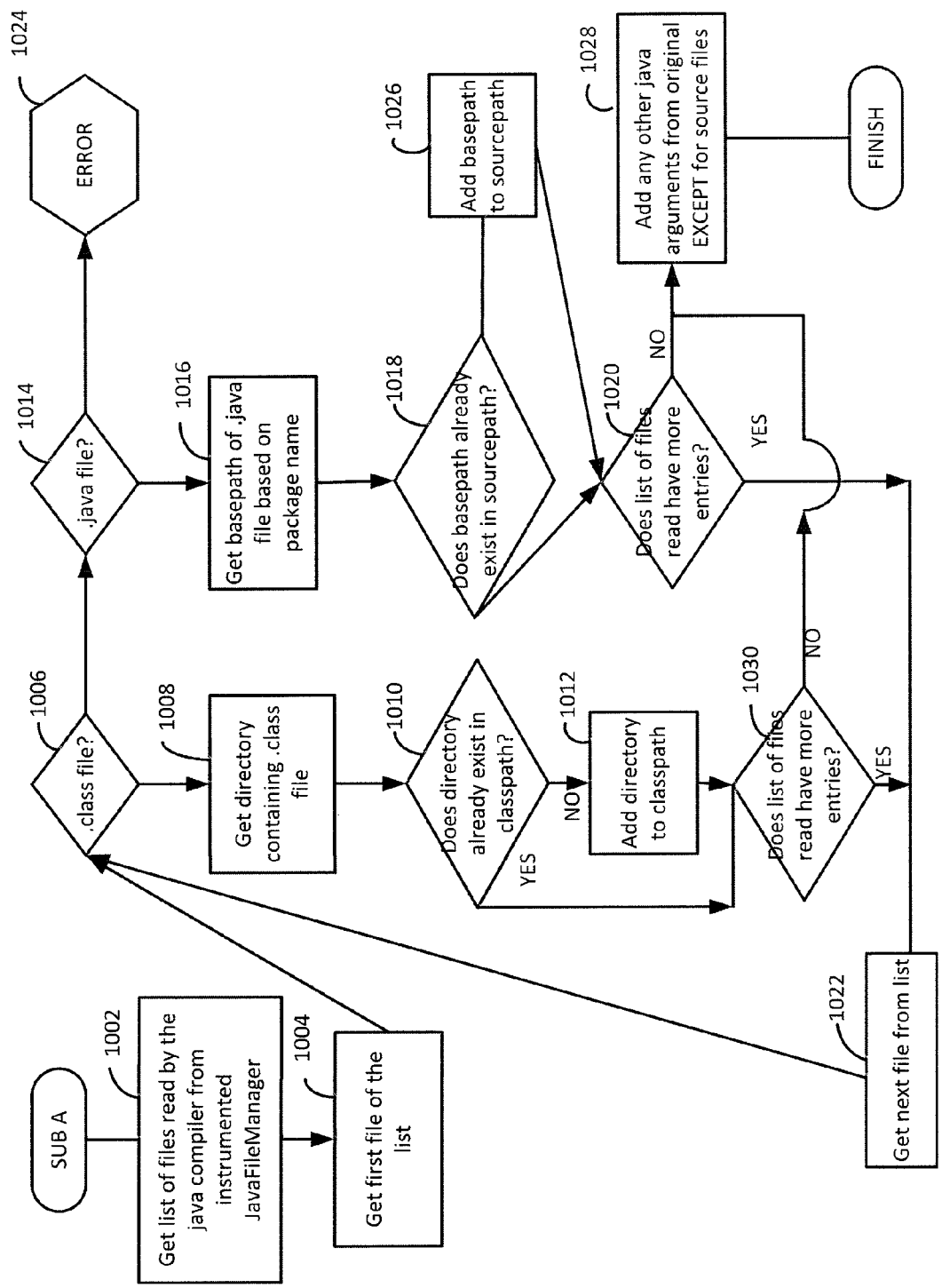
FIG. 10 is a flowchart for a step of building a compilation description of FIG. 9.

In FIG. 10, step 1002, the list of files read by the java compiler is obtained from the instrumented JavaFileManager. At step 1004, the first file of the list is obtained.

At step 1006, a decision is made as to whether the file is a class file (i.e., indicated by .class). For files that are class files, at step 1008, the directory containing the class file is obtained. At step 1010 a decision is made as to whether the directory already exists in the classpath. At step 1012, if it does not already exist in the classpath, the directory is added to the classpath, and at step 1030, it is determined whether more entries are in the list of read files. Steps beginning at step 1006 are repeated.

At step 1014, a decision is made as to whether the file is a source file (i.e., indicated by .java). For files that are source files, at step 1016, the base path of the source file is obtained based on the package name. At step 1018, a decision is made as to whether the base path already exists in the sourcepath. If it does not already exist, at step 1026, the base path is added to the sourcepath. At step 1020, it is determined whether more entries are in the list of read files. At step 1022, the next file is obtained from the list of read files, and steps 1006 to 1018 are repeated.

If a file is neither a class file, at step 1006, nor a source file, at step 1014, an error may be generated at step 1024. When there are no more files in the list of read files, at step 1028, any other java arguments are added verbatim from the original, except for source files. As noted before, other Java arguments include flags passed to the compiler that are needed for compilation, but are not necessary for building a minimized set of dependent sources and classes. The result of step 906 is java arguments, a sourcepath and a classpath.

In FIG. 9, step 908, a first source file is obtained from the compilation information of step 902.

At step 910, the shared compilation description of step 906 is specialized by adding a source file argument. At step 912, the specialized compilation description and required files are stored in the datastore. At step 916, a decision is made as to whether the original compilation has more source files. When there are more source files, at step 914, the next source file is obtained from the compilation information, and steps 910 and 912 are repeated.

Phase 1, Approach (d)—Modified Recompilation

In this approach, the java compiler is run once on the original command line arguments (this means all source files) to produce output in path <outputpath>. Then approach (a) is used with the following modification: instead of passing in a modified sourcepath to have the individual file compilations locate any interdependent sources, the classpath is modified to include <outputpath>. This breaks intersource dependencies by changing the source dependencies to class dependencies. Subsequently, the sharding doesn't have to deal with interdependent source files but only with dependent class files. The compilation/analysis that runs in phase 2 is slightly different from the original compilation, but it has been determined that for 99% of the use cases of the analysis there will be no distinguishable differences.

Figure 11:
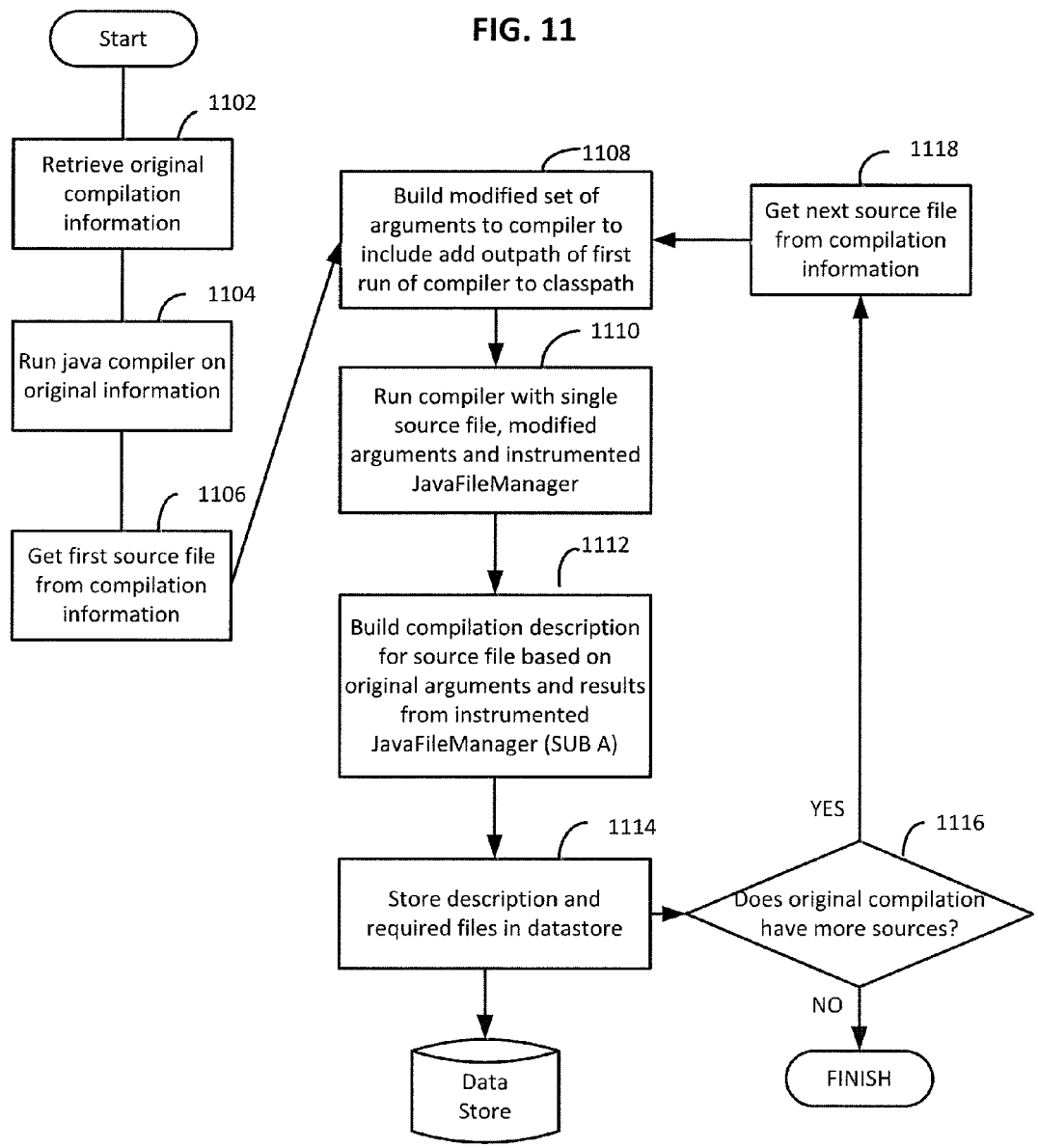
FIG. 11 is a flowchart for a technique (d) for a sharding phase.

FIG. 11 is a flowchart for this approach. At step 1102, the original compilation information is obtained. The original compilation information can be a classpath, a list of source files, and other java compiler arguments that are not necessary for determining a minimized set of sources and classes that are included in an initial compiler commandline. At step 1104, the compiler is run on the original compilation information (an initial compiler commandline is invoked). At step 1106, a first source file is obtained from the compilation information. At step 1108, a modified set of arguments to the compiler is built to add an outpath of the run of the compiler to classpath.

Figure 12:
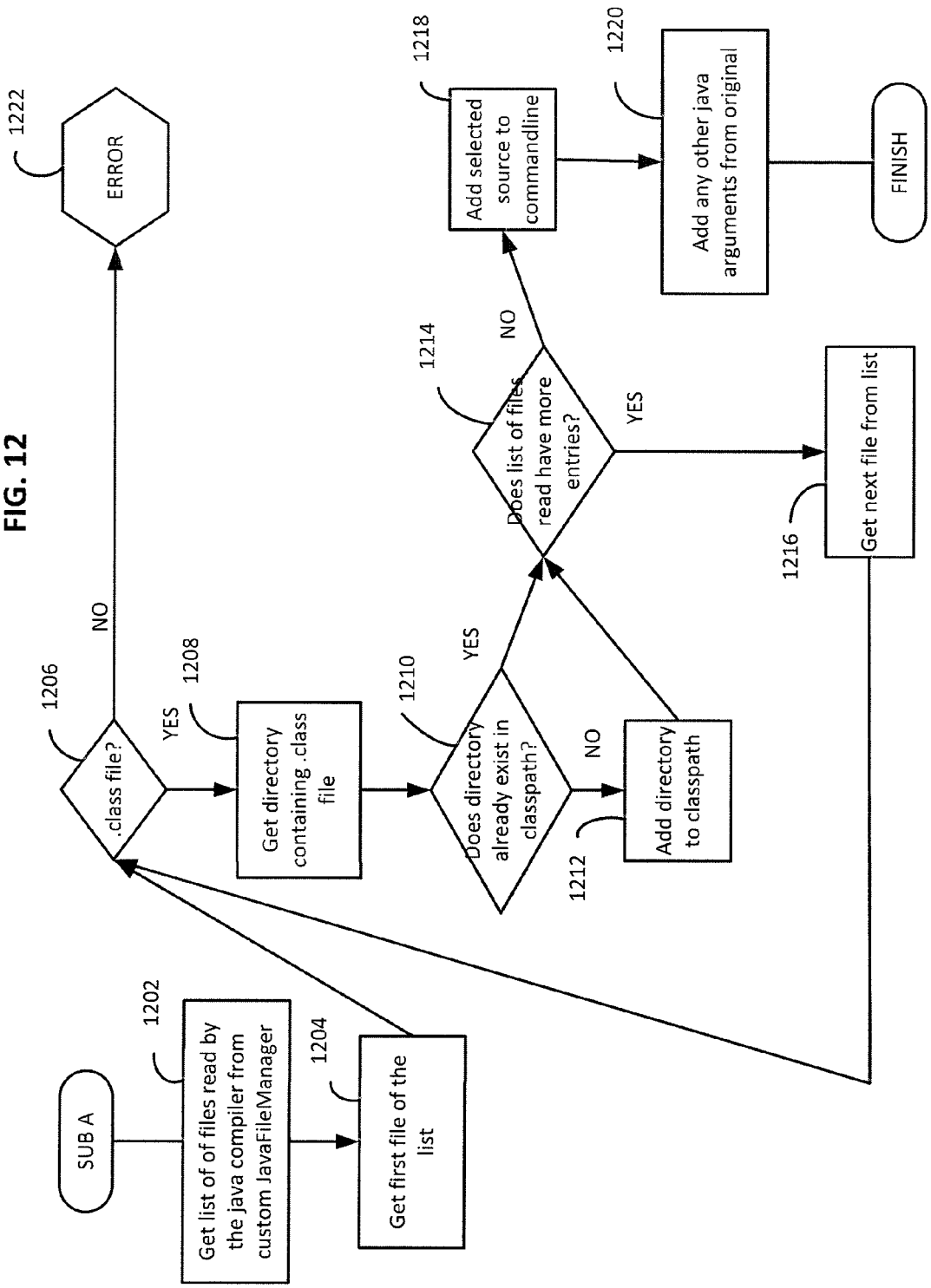
FIG. 12 is a flowchart for a step of building a compilation description of FIG. 11.

At step 1110, the compiler is run with a single source file, modified arguments from step 1108, and an instrumented JavaFileManager. At step 1112, a compilation description is built for the source file based on original arguments and results from the instrumented JavaFileManager. Details of step 1112 (SUB A) are shown in FIG. 12.

At step 1202, a list of files read by the compiler is obtained from the instrumented JavaFileManager. At step 1204, a first file is obtained from the list.

At step 1206, a decision is made as to whether the file is a class file (i.e., indicated by .class). For files that are class files, at step 1208, the directory containing the class file is obtained. At step 1210, a decision is made as to whether the directory already exists in the classpath. At step 1212, if it does not already exist in the classpath, the directory is added to the classpath.

At step 1214, it is determined whether more entries are in the list of read files. At step 1216, the next file is obtained from the list of read files, and steps 1206 to 1212 are repeated.

If a file is not a class file, at step 1206, an error is generated at step 1222. When there are no more files in the list of read files, at step 1218, the selected source file from step 1108 or step 1118 is added to the commandline. At step 1220, any other java arguments are added verbatim from the original. Other Java arguments can include flags passed to the compiler that are needed for compilation, but are not necessary for building a minimized set of dependent sources and classes. The result of step 1112 is a selected source file, java arguments, and a classpath.

At step 1114, the compilation description and required files are stored as structured data in a data store. At step 1116, it is determined whether there exist more source files in the original compilation information. At step 1118, a next source file is obtained from the compilation information, and steps 1108 to 1114 are repeated until, at step 1116, no more source files are in the original compilation information.

Phase 2—Static Analysis

Phase 2 is run by any static analysis tool that requested participation in the sharded analysis. The static analysis is performed in a distributed fashion, where parts of the analysis can be performed by separate processes. In performing the distributed static analysis, all entries from the data store 120 are retrieved and used to perform the static analysis that is requested. Alternatively, a subset of a codebase may be retrieved and used to perform a static analysis, as necessary. If the static analysis tool supports virtual file systems, this can be leveraged to speed up analysis by having the analysis tool retrieve the files directly from the datastore. If not, the analysis phase will copy the required files locally before running the analysis tool.

Figure 13:
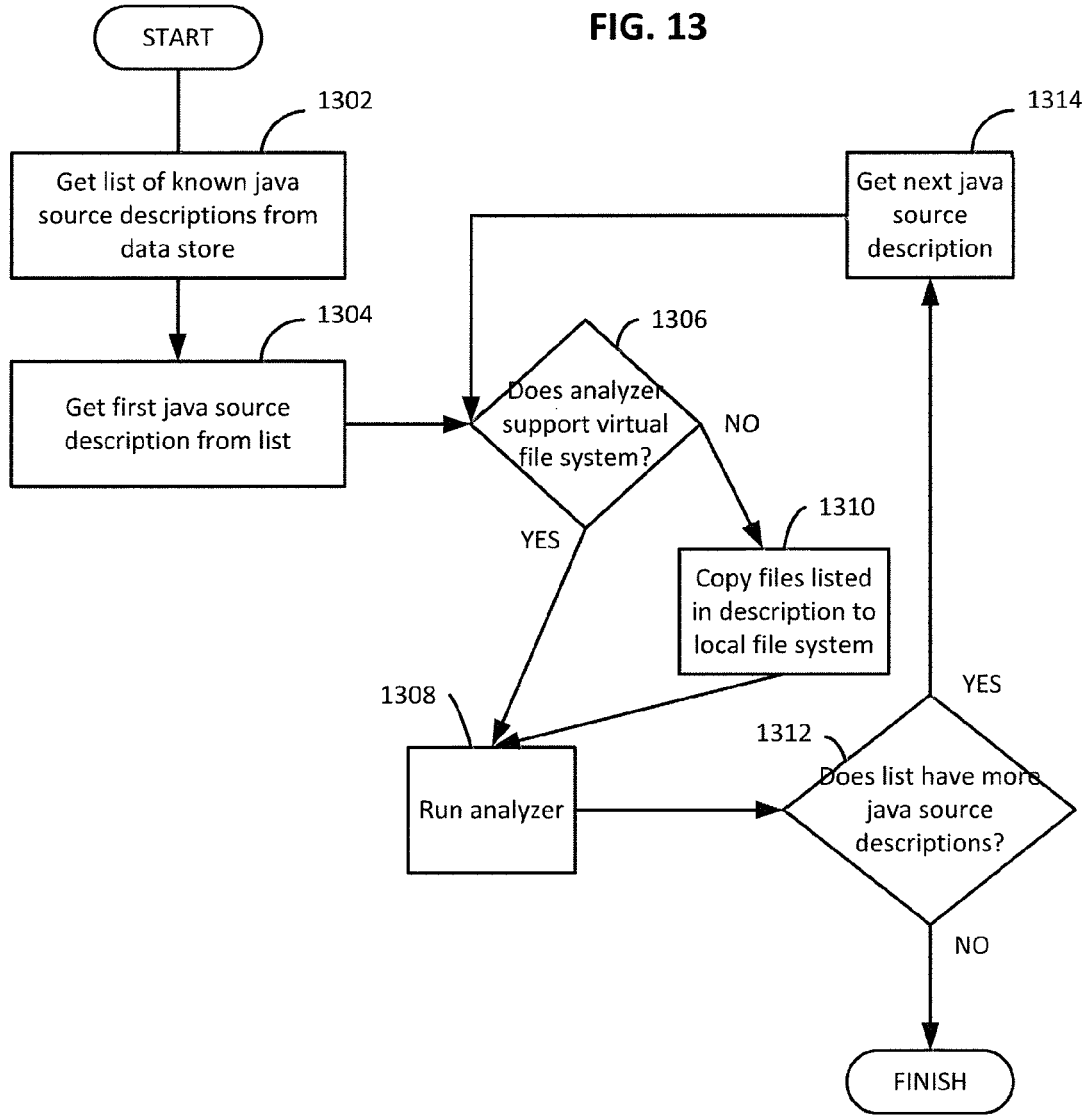
FIG. 13 is a flowchart for a static analysis phase.

FIG. 13 is a flowchart for static analysis for files stored in the data store. At step 1302, a list of java source descriptions is retrieved from the data store. At step 1304, a first java source description is obtained from the list. At step 1306, it is determined whether the static analyzer supports a virtual file system. At step 1308, when the static analyzer does support a virtual file system, the analyzer is run by retrieving files directly from the data store. At step 1310, when the static analyzer does not support a virtual file system, files listed in the description are copied to the local file system, and the static analyzer is run using the copied files. Although these steps are shown as sequential, the analysis can be performed by separate processes in a distributed fashion.

At step 1312, it is determined whether there are more source descriptions in the list. At step 1314, the next source description is obtained from the list until at step 1312, there are no more source descriptions.

Figure 14:
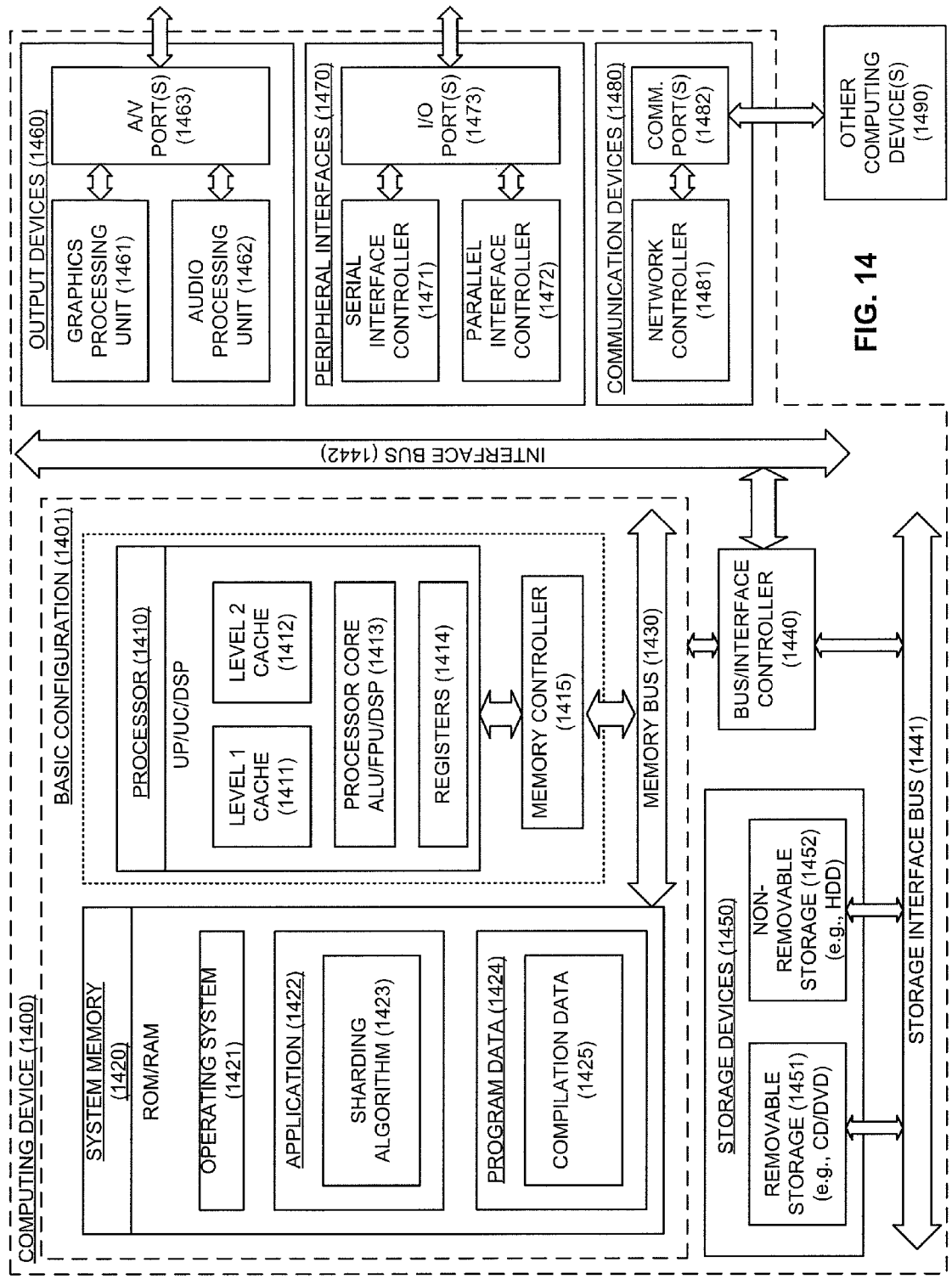
FIG. 14 shows an example of a computer for performing compilation and static analysis.

FIG. 14 is a block diagram illustrating an example computing device 1400 that is arranged for performing compilation or performing static analysis. In a very basic configuration 1401, computing device 1400 typically includes one or more processors 1410 and system memory 1420. A memory bus 1430 can be used for communicating between the processor 1410 and the system memory 1420.

Depending on the desired configuration, processor 1410 can be of any type including but not limited to a microprocessor (µP), a microcontroller (µC), a digital signal processor (DSP), or any combination thereof. Processor 1410 can include one more levels of caching, such as a level one cache 1411 and a level two cache 1412, a processor core 1413, and registers 1414. The processor core 1413 can include an arithmetic logic unit (ALU), a floating point unit (FPU), a digital signal processing core (DSP Core), or any combination thereof. A memory controller 1415 can also be used with the processor 1410, or in some implementations the memory controller 1415 can be an internal part of the processor 1410.

Depending on the desired configuration, the system memory 1420 can be of any type including but not limited to volatile memory (such as RAM), non-volatile memory (such as ROM, flash memory, etc.) or any combination thereof. System memory 1420 typically includes an operating system 1421, one or more applications 1422, and program data 1424. Application 1422 includes a sharding processing algorithm 1423. Program Data 1424 includes compilation data 1425, as described above. In some embodiments, application 1422 can be arranged to operate with program data 1424 on an operating system 1421. This described basic configuration is illustrated in FIG. 14 by those components within dashed line 1401.

Computing device 1400 can have additional features or functionality, and additional interfaces to facilitate communications between the basic configuration 1401 and any required devices and interfaces. For example, a bus/interface controller 1440 can be used to facilitate communications between the basic configuration 1401 and one or more data storage devices 1450 via a storage interface bus 1441. The data storage devices 1450 can be removable storage devices 1451, non-removable storage devices 1452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1420, removable storage 1451 and non-removable storage 1452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer storage media can be part of device 1400.

Computing device 1400 can also include an interface bus 1442 for facilitating communication from various interface devices (e.g., output interfaces, peripheral interfaces, and communication interfaces) to the basic configuration 1401 via the bus/interface controller 1440. Example output devices 1460 include a graphics processing unit 1461 and an audio processing unit 1462, which can be configured to communicate to various external devices such as a display or speakers via one or more A/V ports 1463. Example peripheral interfaces 1470 include a serial interface controller 1471 or a parallel interface controller 1472, which can be configured to communicate with external devices such as input devices (e.g., keyboard, mouse, pen, voice input device, touch input device, etc.) or other peripheral devices (e.g., printer, scanner, etc.) via one or more I/O ports 1473. An example communication device 1480 includes a network controller 1481, which can be arranged to facilitate communications with one or more other computing devices 1490 over a network communication via one or more communication ports 1482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by one or more processors, comprising:
   receiving original compilation information, including one or more groups of source files and a module path that identifies a location of module containers, the one or more groups of source files referencing modules in the module containers;
   running a compiler to determine a set of modules in the module containers that are referenced by a single source file of the groups of source files and to determine other source files that are referenced by the single source file, the step of running the compiler including:
      building a modified set of arguments for further source files of the source files in the one or more groups;
      compiling the single source file, with the modified set of arguments and an instrumented file manager object; and
      tracking, by the file manager object, which files are read while compiling;
   modifying the compilation information on the basis of the single source file, by replacing the one or more groups of source files with the single source file, by replacing the module path with a new module path, the new module path identifying the location of the referenced set of modules, and by including other source files referenced by the single source file,
   the step of modifying the compilation information including:
      building a compilation description, including the new module path, for the single source file based on files tracked by the file manager object, the new module path being a classpath, and the step of building a compilation description for the single source file including:
         receiving the list of tracked files;
         obtaining a directory containing a tracked file that is a class file;
         building a classpath to include the directory;
         obtaining a basepath of a tracked file that is a source file;
         building a sourcepath to include the basepath;
         building the compilation description for the single source file by including the single source file, the classpath, and the sourcepath; and
         storing the compilation description and list of tracked files as structured data in a data store; and
   performing the static analysis on the single source file using the compilation description and the list of tracked files stored in the data store.

2. The method of claim 1, wherein the original compilation information is a command line for a Java compiler.

3. The method of claim 1, wherein the steps of running and modifying are performed for each source file in the original compilation information.

4. The method of claim 1, further comprising: retrieving a list of java source files from the data store;
   for each listed java source file, running a static analyzer that supports a virtual file system;
   copying files listed to a local file system; and
   running the static analyzer for a static analyzer that does not support a virtual file system.

5. A system comprising:
   one or more processors;
   a computer-readable medium coupled to the one or more processors having instructions stored thereon that, when executed by the one or more processors, cause the one or more processors to perform operations comprising:
   receiving original compilation information, including one or more groups of source files and a module path that identifies a location of module containers, the one or more groups of source files referencing modules in the module containers;
   running a compiler to determine a set of modules in the module containers that are referenced by a single source file of the groups of source files and to determine other source files that are referenced by the single source file, the step of running the compiler including:
      building a modified set of arguments for further source files of the source files in the one or more groups;
      compiling the single source file, with the modified set of arguments and an instrumented file manager object; and
      tracking, by the file manager object, which files are read while compiling;
   modifying the compilation information on the basis of the single source file, by replacing the one or more groups of source files with the single source file, by replacing the module path with a new module path, the new module path identifying the location of the referenced set of modules, and by including other source files referenced by the single source file,
   the step of modifying the compilation information including:
      building a compilation description, including the new module path, for the single source file based on files tracked by the file manager object, the new module path being a classpath, and the step of building a compilation description for the single source the including:
receiving the list of tracked files;
obtaining a directory containing a tracked file that is a class file;
building a classpath to include the directory;
obtaining a basepath of a tracked file that is a source file;
building a sourcepath to include the basepath;
building the compilation description for the single source file by including the single source file, the classpath, and the sourcepath; and
storing the compilation description and list of tracked files as structured data in a data store; and
performing the static analysis on the single source file using the compilation description and the list of tracked files stored in the data store.

6. The system of claim 5, wherein the original compilation information is a command line for a Java compiler.

7. The system of claim 5, wherein the running and modifying are performed for each source file in the original compilation information.

8. The system of claim 5, further comprising:
retrieving a list of java source files from the data store;
for each listed java source files, running a static analyzer that supports a virtual file system;
copying files listed to a local file system; and
running the static analyzer for a static analyzer that does not support a virtual file system.

9. A non-transitory computer-readable storage medium storing a computer program that, when executed by a computer performs steps of:
receiving original compilation information, including one or more groups of source files and a module path that identifies a location of module containers, the one or more groups of source files referencing modules in the module containers;
running a compiler to determine a set of modules in the module containers that are referenced by a single source file of the groups of source files and to determine other source files that are referenced by the single source file, the step of running the compiler including:
building a modified set of arguments for further source files of the source files in the one or more groups;
compiling the single source file, with the modified set of arguments and an instrumented file manager object; and
tracking, by the file manager object, which files are read while compiling;
modifying the compilation information on the basis of the single source file, by replacing the one or more groups of source files with the single source file, by replacing the module path with a new module path, the new module path identifying the location of the referenced set of modules, and by including other source files referenced by the single source file,
the step of modifying the compilation information including:
building a compilation description, including the new module path, for the single source file based on files tracked by the file manager object, the new module path being a classpath, and the step of building a compilation description for the single source the including:
receiving the list of tracked files;
obtaining a directory containing a tracked file that is a class file;
building a classpath to include the directory;
obtaining a basepath of a tracked file that is a source file;
building a sourcepath to include the basepath;
building the compilation description for the single source file by including the single source file, the classpath, and the sourcepath; and
storing the compilation description and list of tracked files as structured data in a data store; and
performing the static analysis on the single source file using the compilation description and the list of tracked files stored in the data store.

10. The non-transitory computer-readable storage medium of claim 9, wherein the original compilation information is a command line for a Java compiler.

11. The non-transitory computer-readable storage medium of claim 9, wherein the steps of running and modifying are performed for each source file in the original compilation information.

12. The non-transitory computer-readable storage medium of claim 9, further comprising:
retrieving a list of java source files from the data store;
for each listed java source file, running a static analyzer that supports a virtual file system;
copying files listed to a local file system; and
running the static analyzer for a static analyzer that does not support a virtual file system.

\* \* \* \* \*